(12) United States Patent
Lindberg

(10) Patent No.: US 11,268,461 B2
(45) Date of Patent: Mar. 8, 2022

(54) METHOD FOR CONTROLLING GASEOUS FUEL PRESSURE

(71) Applicant: VOLVO TRUCK CORPORATION, Gothenburg (SE)

(72) Inventor: Johan Lindberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/766,420

(22) PCT Filed: Nov. 23, 2017

(86) PCT No.: PCT/EP2017/080260
§ 371 (c)(1),
(2) Date: May 22, 2020

(87) PCT Pub. No.: WO2019/101326
PCT Pub. Date: May 31, 2019

(65) Prior Publication Data
US 2021/0062737 A1 Mar. 4, 2021

(51) Int. Cl.
*F02M 1/00* (2006.01)
*F02D 41/00* (2006.01)
(Continued)

(52) U.S. Cl.
CPC ..... *F02D 41/0027* (2013.01); *F02D 19/0647* (2013.01); *F02D 2041/1412* (2013.01);
(Continued)

(58) Field of Classification Search
CPC ............ F02D 41/3809; F02D 41/3836; F02D 41/3845; F02D 41/3863; F02D 2250/04; F02D 2250/31
(Continued)

(56) References Cited

U.S. PATENT DOCUMENTS

| 4,459,084 A * | 7/1984 | Clark | F02B 75/04 417/11 |
| 4,541,243 A * | 9/1985 | Clark | F02B 75/04 417/380 |

(Continued)

FOREIGN PATENT DOCUMENTS

| CN | 1978881 A | 6/2007 |
| CN | 101586505 A | 11/2009 |

(Continued)

OTHER PUBLICATIONS

International Search Report and Written Opinion dated Aug. 1, 2018 in corresponding International PCT Application No. PCT/EP2017/080260, 10 pages.

(Continued)

*Primary Examiner* — John Kwon
(74) *Attorney, Agent, or Firm* — Venable LLP; Jeffri A. Kaminski

(57) ABSTRACT

The invention relates to a method for controlling gaseous fuel pressure in an accumulator (12) of a fuel system (10) for a combustion engine (102) of a vehicle (100), wherein the method comprises the steps of: determining a nominal amount of gaseous fuel to be introduced into the accumulator; introducing less gaseous fuel into the accumulator than the determined nominal amount by reducing or closing an inlet valve (24), which inlet valve is adapted to regulate input of gaseous fuel to the accumulator; and while the inlet valve is reduced or closed, performing at least one injection of gaseous fuel coming from the accumulator into at least one combustion chamber (104a-f) of the combustion engine by at least one injector (14a-f) of the fuel system, which at least one injection contributes to combustion in the combustion engine, thereby reducing pressure in the accumula- (Continued)

tor. The invention also relates to a corresponding fuel system (10).

18 Claims, 5 Drawing Sheets

(51) Int. Cl.
*F02D 19/06* (2006.01)
*F02D 41/14* (2006.01)
*F02M 21/02* (2006.01)

(52) U.S. Cl.
CPC .. *F02D 2200/0602* (2013.01); *F02D 2250/31* (2013.01); *F02M 21/0239* (2013.01)

(58) Field of Classification Search
USPC ................ 123/445, 447, 456, 457, 462, 463
See application file for complete search history.

(56) References Cited

U.S. PATENT DOCUMENTS

| | | | | |
|---|---|---|---|---|
| 4,606,708 A | * | 8/1986 | Clark | ...................... F02B 75/04 417/380 |
| 2003/0051709 A1 | | 3/2003 | Yu | |
| 2021/0033043 A1 | * | 2/2021 | Ishikawa | ............. F02D 41/3863 |

FOREIGN PATENT DOCUMENTS

| | | |
|---|---|---|
| DE | 102006000170 A1 | 11/2006 |
| DE | 102008006567 A1 | 7/2009 |
| DE | 102010053695 A1 | 6/2011 |
| DE | 102010052239 A1 | 8/2011 |
| EP | 2123890 A1 | 11/2009 |
| JP | 2005256703 A | 9/2005 |
| WO | 2004007945 A1 | 1/2004 |
| WO | 2017102039 A1 | 6/2017 |

OTHER PUBLICATIONS

China Office Action dated Dec. 13, 2021 in corresponding China Patent Application No. 201780097097.4, 11 pages.

* cited by examiner

METHOD FOR CONTROLLING GASEOUS FUEL PRESSURE

CROSS-REFERENCE TO RELATED APPLICATIONS

This application is a U.S. National Stage application of PCT/EP2017/080260, filed Nov. 23, 2017 and published on May 31, 2019 as WO 2019/101326 A1, all of which is hereby incorporated by reference in its entirety

TECHNICAL FIELD

The invention relates to a method for controlling gaseous fuel pressure in an accumulator of a fuel system for a combustion engine of a vehicle. The invention also relates to a fuel system for a combustion engine of a vehicle.

The invention can be applied in heavy-duty vehicles, such as trucks, buses and construction equipment. Although the invention will be described with respect to a truck, the invention is not restricted to this particular vehicle.

BACKGROUND

A fuel system for a combustion engine running on gaseous fuel, like natural gas, may include an accumulator in the form of a (common) rail which is fluidly connected to a plurality of fuel injectors. During operation, the rail pressure is a control variable for the combustion which changes during operation. In order to decrease the rail pressure during operation, as a response to decreasing fuel demand, an existing solution today includes venting gas back to a tank, and when the tank pressure pass a certain threshold a pressure controlled valve release the gas to surroundings. To use the gas in the tank as fuel a second time, it usually has to be pressurized again, which require energy.

SUMMARY

An object of the invention is to provide an improved method for controlling gaseous fuel pressure in an accumulator of a fuel system for a combustion engine of a vehicle, which method in particular may minimize the amount of gas that needs to be vented when the pressure in the accumulator needs to be decreased.

According to a first aspect of the invention, the object is achieved by a method according to claim 1. According to a second aspect of the invention, the object is achieved by a fuel system according to claim 14.

According to the first aspect, there is provided a method for controlling gaseous fuel pressure in an accumulator of a fuel system for a combustion engine of a vehicle, wherein method comprises the steps of: determining a nominal amount of gaseous fuel to be introduced into the accumulator; introducing less gaseous fuel into the accumulator than the determined nominal amount by reducing or closing an inlet valve, which inlet valve is adapted to regulate input of gaseous fuel to the accumulator; and while the inlet valve is reduced or closed, performing at least one injection of gaseous fuel coming from the accumulator into at least one combustion chamber of the combustion engine by at least one injector of the fuel system, which at least one injection contributes to combustion in the combustion engine, thereby reducing pressure in the accumulator.

The invention is based on the understanding that pressure in the accumulator may be reduced by use of combustion contributing fuel injection(s) only, while the inlet valve is closed or reduced more than normal, without having to vent gaseous fuel from the accumulator to some tank. Consequently, this reduces or eliminates the need of venting the accumulator when the fuel demand is decreasing during operation.

It can be noted that EP2123890 A1 discloses a method for controlling operating pressure by triggering injections, but for a diesel engine, i.e. liquid fuel. Also, the injections EP2123890 A1 are injections which do not contribute to the combustion process and thus to torque generation, and they are triggered during the exhaust stroke. Contrary to the present invention, the injections in EP2123890 A1 consequently leads to fuel in the exhaust that somehow needs to be handled.

As indicated above, the at least one injection of the invention may be performed without venting gaseous fuel from the accumulator to a tank of the fuel system. The fuel system may for example further comprise a release valve adapted to regulate venting of gaseous fuel from the accumulator to said tank, wherein the at least one injection is performed while the release valve is closed.

The inlet valve and the release valve may be individually and electrically operated. In this way, both valves can readily be closed at the same time. Alternatively, the inlet and release valves may be mechanically coupled and synchronized such that one of the valves is open when the other is closed, and vice versa. In this case, both may be closed at the same time by operating the valves in a deadband (offset) of the valves. Furthermore, in case the vehicle is a dual fuel vehicle, for example running on methane and diesel, the inlet valve (for methane) may be reduced or closed by controlling the diesel pressure accordingly.

In one embodiment, the reducing of pressure is performed in response to a current accumulator pressure need. This refers to normal operation (not shutting down), wherein there is a decreased fuel demand, whereby the present pressure in the accumulator (before the reduction) is higher than the current accumulator pressure need. Here, the at least one injection may have a near minimum duration, for example up to 120% of minimum duration. That is, the at least one injection may have a duration with is near, but longer than, the minimum duration. In this way, the at least one injection does not produce so much excessive torque. 'Minimum duration' is the shortest time that the at least one injector can be open, due to its construction/control/etc. Any excessive torque caused by the reducing of pressure may be mitigated by braking the vehicle. In this way, the excessive torque does not affect the ride of the vehicle. Alternatively or complementary, any excessive torque caused by the reducing of pressure may be mitigated by recuperating the energy of the excessive torque in an electric machine and/or energy storage of the vehicle in which case energy losses may be reduced or minimized. Recuperating the energy is particularly useful in case the vehicle has a hybrid powertrain including electric propulsion. For example, the excess torque from the combustion engine may be compensated for by an equal amount of negative torque from the electric machine connected to the same powertrain, by that the accelerating torque of the vehicle will still be the nominal torque requested.

In another embodiment, the method further comprises: predicting a future accumulator pressure need, wherein the reducing of pressure is performed in advance in response to the predicted future accumulator pressure need. That is, the pressure is reduced before the need exists. This means that the resulting pressure may be lower than the current need. The in advance reducing of pressure may be mitigated by prolonging the duration of the at least one injection, so that enough fuel is supplied, and the ride of the vehicle is not negatively affected. The future accumulator pressure need may for example be predicted by means of an e-horizon system, such as Volvo Trucks' I-See system.

In the embodiments described above, the inlet valve may be reduced or closed and the at least one injection may be performed such that the inlet valve has a reduced gaseous fuel mass flow rate compared to the gaseous fuel mass flow rate of said at least one injection. In other words, less fuel comes in than what comes out, whereby the pressure may be reduced without venting.

The accumulator may be a common rail in fluid communication with the at least one injector. The fuel system may for example have four or six injectors. Alternatively, the accumulator is a high pressure chamber included in the injector, which injector may be referred to as a unit injector. The fuel system may comprise four or six such unit injectors, for example.

The gaseous fuel may be natural gas or biogas, for example.

According to the second aspect, there is provided a fuel system for a combustion engine of a vehicle, wherein the fuel system comprises: an accumulator; an inlet valve adapted to regulate input of gaseous fuel to the accumulator; at least one injector; means configured to determine a nominal amount of gaseous fuel to be introduced into the accumulator; and a control unit configured to reduce or close the inlet valve so as to introduce less gaseous fuel into the accumulator than the nominal amount determined by said means, and to trigger at least one injection of gaseous fuel coming from the accumulator into at least one combustion chamber of the combustion engine by the at least one injector, while the inlet valve is reduced or closed, which at least one injection contributes to combustion in the combustion engine, thereby reducing pressure in the accumulator. This aspect may exhibit the same or similar features and technical effects as the previous aspect, and vice versa.

The invention also relates to a computer program comprising program code means for performing steps of the first aspect when said program is run on a computer.

The invention also relates to a computer readable medium carrying a computer program comprising program code means for performing steps of the first aspect when said program product is run on a computer.

The invention also relates to a control unit for controlling gaseous fuel pressure in an accumulator of a fuel system for a combustion engine of a vehicle, the control unit being configured to perform or trigger steps of the first aspect.

The invention also relates to a vehicle comprising a fuel system according to the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
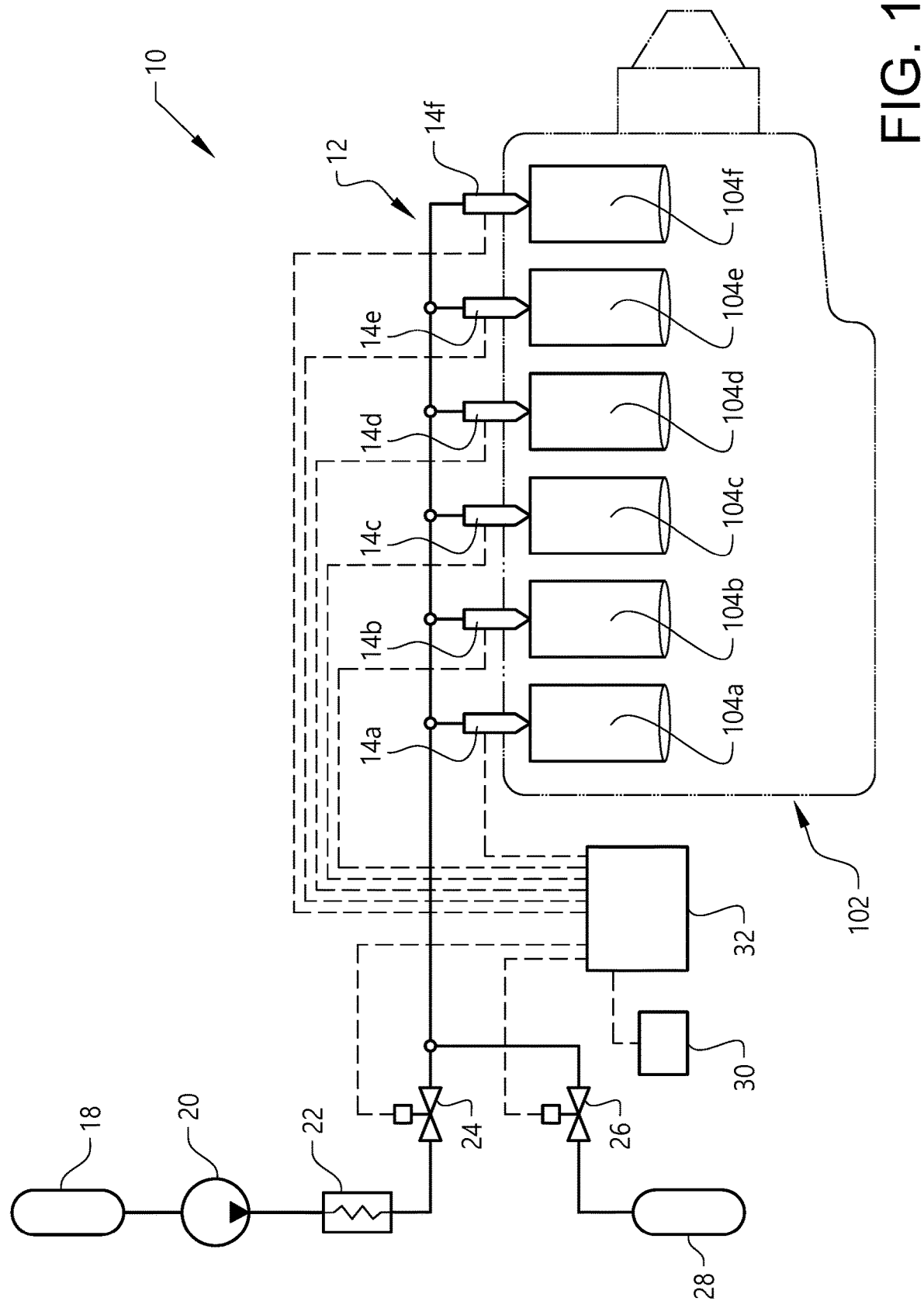
FIG. 1 is a schematic view of a fuel system for a combustion engine according to an embodiment of the invention.
Figure 2:
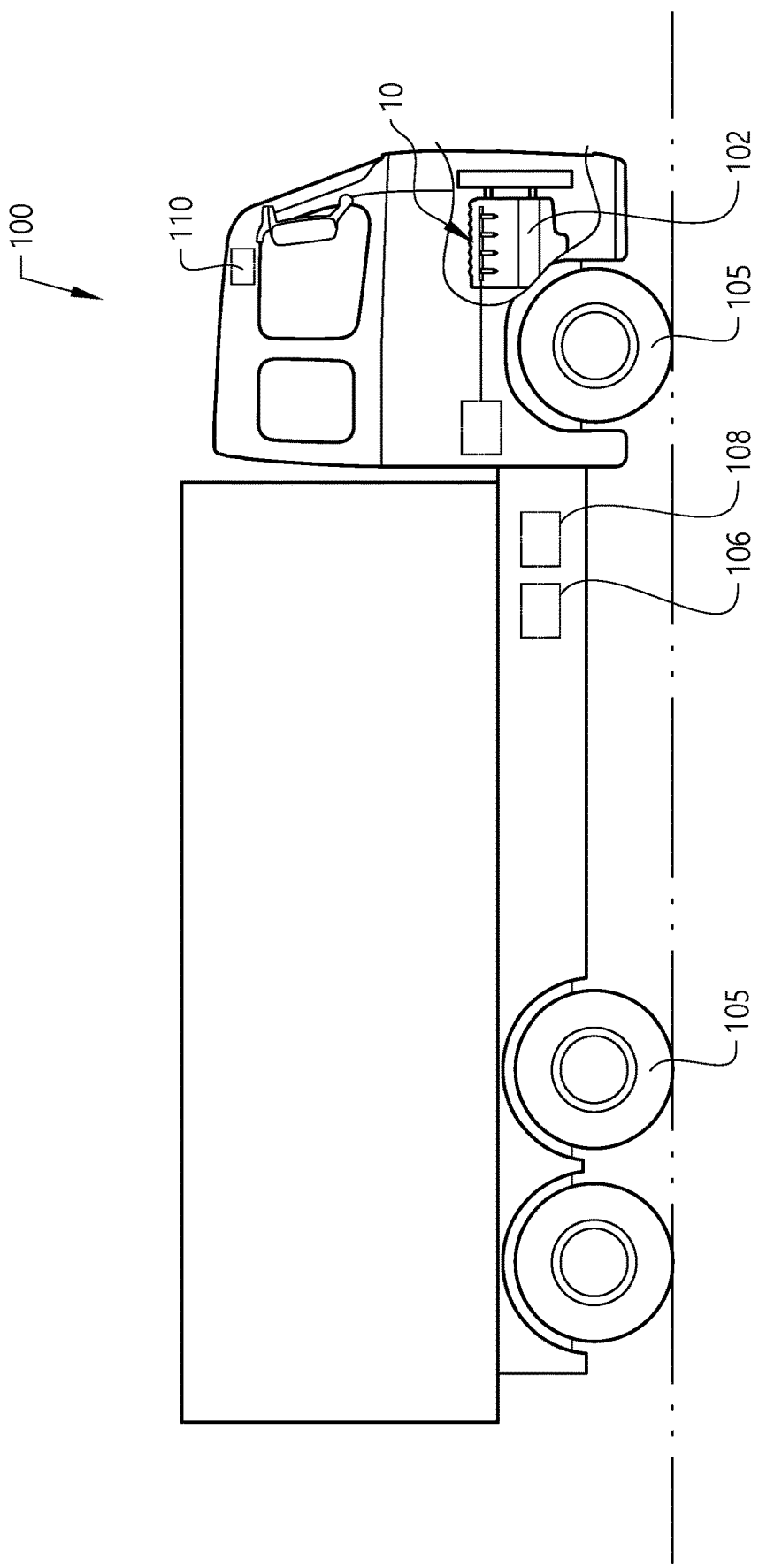
FIG. 2 is a schematic view of a vehicle comprising the fuel system and combustion engine of FIG. 1.

FIG. 1 illustrates a fuel system 10 for a combustion engine 102 of a vehicle 100 according to an embodiment of the invention. The vehicle 100 may for example be a truck, as illustrated in FIG. 2, or some other heavy-duty vehicle, such as a bus or construction equipment.

The fuel system 10 comprises an accumulator in the form of a common rail 12, and a plurality of injectors 14a-f, here six injectors. Each injector 14a-f is in fluid communication with the common rail 12. Each injector 14a-f may perform an injection of fuel coming from the common rail 12 into a respective combustion chamber 104a-f of the combustion engine 102.

The fuel system 10 may further comprise a tank 18, for example a liquefied natural gas (LNG) tank, a pump 20 connected to the tank 18, and an evaporator 22 connected to the pump 20. The pump 20 may pump liquefied natural gas from the tank 18 to the evaporator 22 where the liquefied natural gas is evaporated to form gaseous fuel, i.e. natural gas in this case.

An inlet valve 24 of the fuel system 10 is arranged between the evaporator 22 and the common rail 12 and adapted to regulate input of gaseous fuel from the evaporator 22 to the common rail 12. A buffer (not shown) could be provided between the evaporator 22 and the inlet valve 24.

The fuel system 10 may further comprise a release valve 26 adapted to regulate venting of gaseous fuel from the common rail 12 to another tank 28 of the fuel system 10.

The fuel system 10 further comprises nominal fuel amount determination means 30 configured to determine a nominal amount of gaseous fuel to be introduced into the common rail 12. The nominal fuel amount determination means 30 may be a fuel injection control function, as the nominal amount of gaseous fuel to be introduced into the common rail 12 should be equal to the fuel demand of the combustion engine 102, which fuel demand in turn depends on torque demand. The fuel amount/demand may be expressed as gaseous fuel mass flow rate (kg/s).

The fuel system 10 further comprises a control unit 32, namely an electronic control unit, connected to the inlet valve 24 and the release valve 26. The inlet valve 24 and the release valve 26 are preferably individually and electrically operated, and controlled by the control unit 32. The control unit 32 is also configured to trigger injections by the injectors 14a-f. The control unit 32 may be connected to the nominal fuel amount determination means 30 and receive the determined nominal amount of gaseous fuel to be introduced into the common rail 12 from the nominal fuel amount determination means 30.

Figure 4:
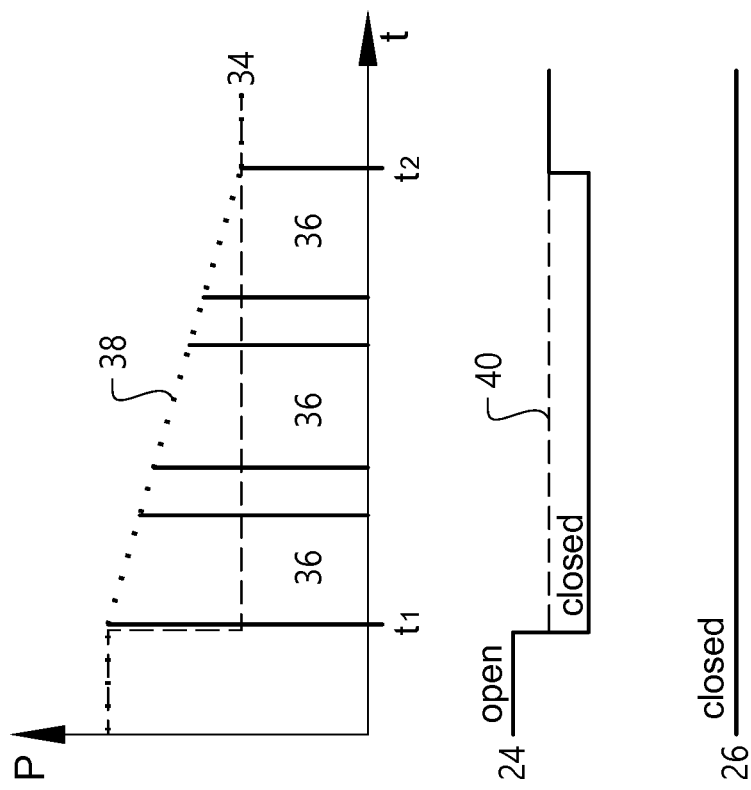
FIG. 4 is a graph illustrating operation according to the method of FIG. 3.
Figure 3:
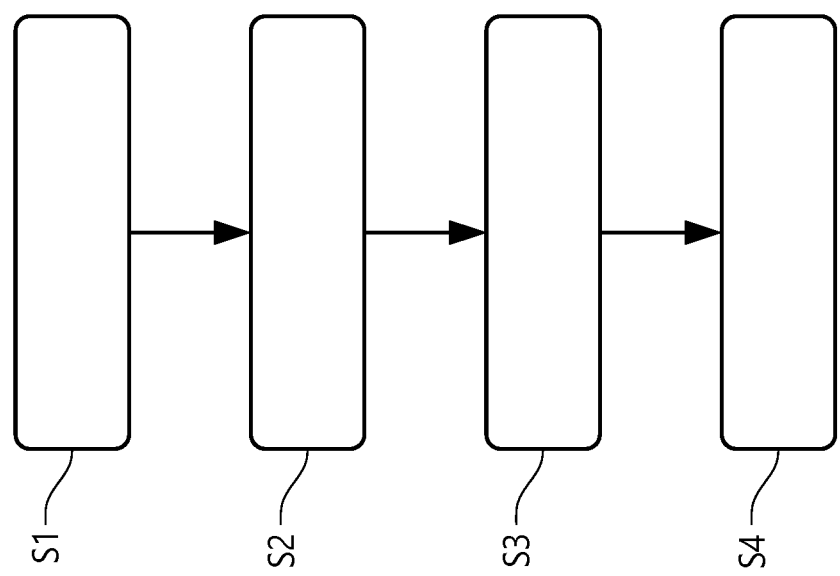
FIG. 3 is a flow chart of a method according to an embodiment of the invention.

A method according to an embodiment of the invention including normal operation (not shutting down of engine 102) will in the following be described with further reference to FIGS. 3-4. In FIG. 4, pressure P is on the vertical axis and time t is on the horizontal axis. Also, positions of the inlet valve 24 and the release valve 26 are illustrated in FIG. 4.

In step S1, a nominal amount of gaseous fuel to be introduced into the common rail 12 is determined by the nominal fuel amount determination means 30 at time t1. At time t1, the current pressure need 34 (dashed line) of the common rail 12 is decreased.

In step S2, less gaseous fuel than the determined nominal amount is introduced into the common rail 12 by closing the inlet valve 24, as controlled by the control unit 32.

While the inlet valve 24 is closed, injections 36 of gaseous fuel into the combustion chambers 104a-f are performed by the injectors 14a-f in step S3, as triggered by the control unit 32, such that the gaseous fuel pressure 38 in the common rail 12 is reduced, preferably without venting gaseous fuel from the common rail 12 to the tank 28 via the release valve 26. To this end, (also) the release valve is closed during step S3. The gaseous fuel in the injections 36 comes from the common rail 12.

The injections 36 in step S3 contribute to combustion in the combustion engine 102. That is, the injections 36 contribute to torque generation. Furthermore, each injection 36 preferable has a duration which is longer than but near the minimum duration, wherein minimum duration is the shortest time that the injectors 14a-f can be open. The near minimum duration of the injections 36 may for example be up to 120% of the minimum duration. If the injections 36 are shorter, it may take too long time to reduce the pressure, and if the injections 36 are longer they may generate too much excessive torque.

Instead of closing the inlet valve 24 in steps S2 and S3, less gaseous fuel may be introduced by merely reducing the inlet valve 24 more than the current pressure need stipulates, as controlled by the control unit 32 taking into account the nominal fuel amount from the nominal fuel amount determination means 30. The "normal" position of the inlet valve 24 as stipulated by the current pressure need is indicated by 40. In any case, the gaseous fuel mass flow rate at the inlet valve 24 should be lower than the gaseous fuel mass flow rate of the injections 36, such that less fuel comes in than what comes out, whereby the pressure in the common rail 12 may be reduced without venting.

Excessive torque caused by the injections 36 used to reduce the pressure in the common rail 12 may be mitigated in step S4. The excessive torque may for example be mitigated by braking the vehicle 100 using brakes 105. Alternatively or complementary, the excessive torque may be mitigated by recuperating the energy of the excessive torque in an electric machine 106 and/or energy storage 108 of the vehicle 100, in which case energy losses may be reduced or minimized.

At time t2, when the gaseous fuel pressure 38 in the common rail 12 has reached the current pressure need 34, the inlet valve 24 may be set to its "normal" position as stipulated by the current pressure need.

Figure 6:
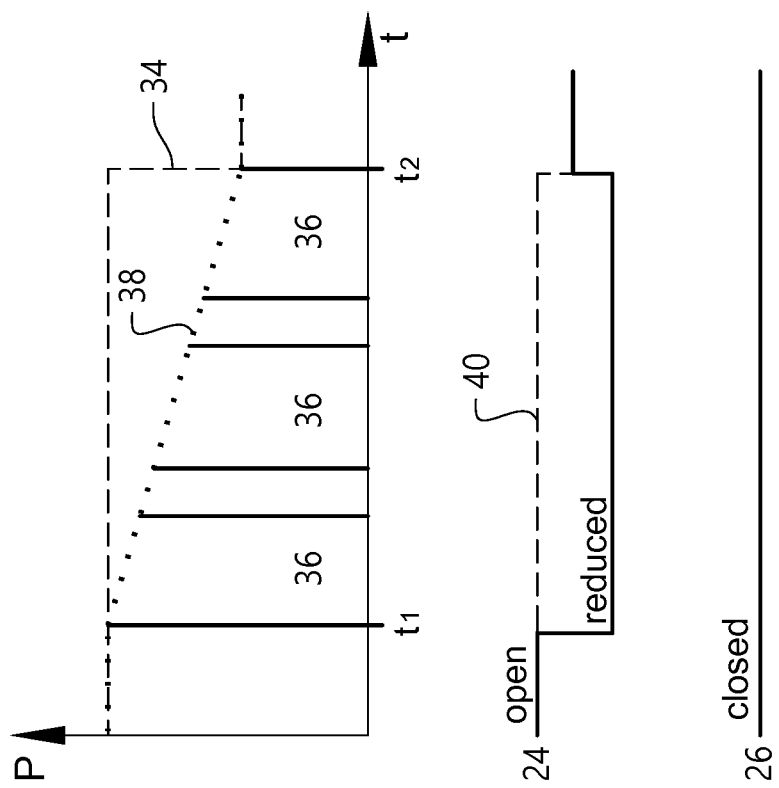
FIG. 6 is a graph illustrating operation according to the method of FIG. 5.
Figure 5:
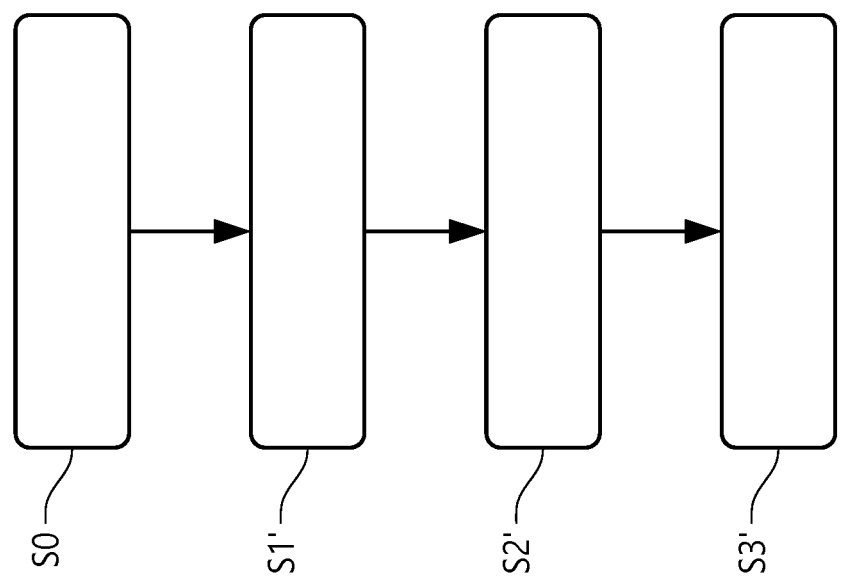
FIG. 5 is a flow chart of a method according to another embodiment of the invention.

A method according to another embodiment of the invention will in the following be described with further reference to FIGS. 5-6. The method in FIGS. 5-6 is similar to that of FIGS. 3-4, but in FIGS. 5-6 the pressure is reduced in advance in response to a predicted future pressure need of the common rail 12, rather than in response to the current pressure need.

In step S0, a future pressure need of the common rail 12 at time t2, namely a decrease in pressure need 34, is predicted. The future accumulator pressure need may for example be predicted by means of an e-horizon system 110 (see FIG. 2), such as Volvo Trucks' I-See system. The e-horizon system 110 may for example predict a future decrease in pressure need based on an upcoming speed limit reduction along the road that the vehicle 100 is travelling.

In step S1', a nominal amount of gaseous fuel to be introduced into the common rail 12 is determined by the nominal fuel amount determination means 30 at time t1, wherein the (current) pressure need 34 of the common rail 12 at time t1 is higher than the predicted future pressure need at time t2.

In step S2', less gaseous fuel than the determined nominal amount is introduced into the common rail 12 by reducing the inlet valve 24 compared to the stipulated position 40, as controlled by the control unit 32.

While the inlet valve 24 is reduced, injections 36 of gaseous fuel into the combustion chambers 104a-f are performed by the injectors 14a-f in step S3', as triggered by the control unit 32, such that the gaseous fuel pressure 38 in the common rail 12 is reduced before time t2, preferably without venting gaseous fuel from the common rail 12 to the tank 28 via the release valve 26. To this end, (also) the release valve is closed during step S3'. The gaseous fuel in the injections 36 comes from the common rail 12. The gaseous fuel mass flow rate at the inlet valve 24 should here be lower than the gaseous fuel mass flow rate of the injections 36, such that less fuel comes in than what comes out, whereby the pressure in the common rail 12 may be reduced in advance without venting.

The injections 36 in step S3' contribute to combustion in the combustion engine 102. That is, the injections 36 contribute to torque generation. Furthermore, each injection 36 may here have a prolonged duration compared to a nominal duration for the current pressure need 34, to compensate for the in advance reduction of gaseous fuel pressure 38 in the common rail 12. Each injection 36 in FIG. 6 may for example be prolonged by up to 50% compared to the nominal duration.

At time t2, when the current pressure need 34 is deceased and "meets" the gaseous fuel pressure 38 in the common rail 12, the inlet valve 24 may be set to its "normal" position as stipulated by the current pressure need.

Figure 7:
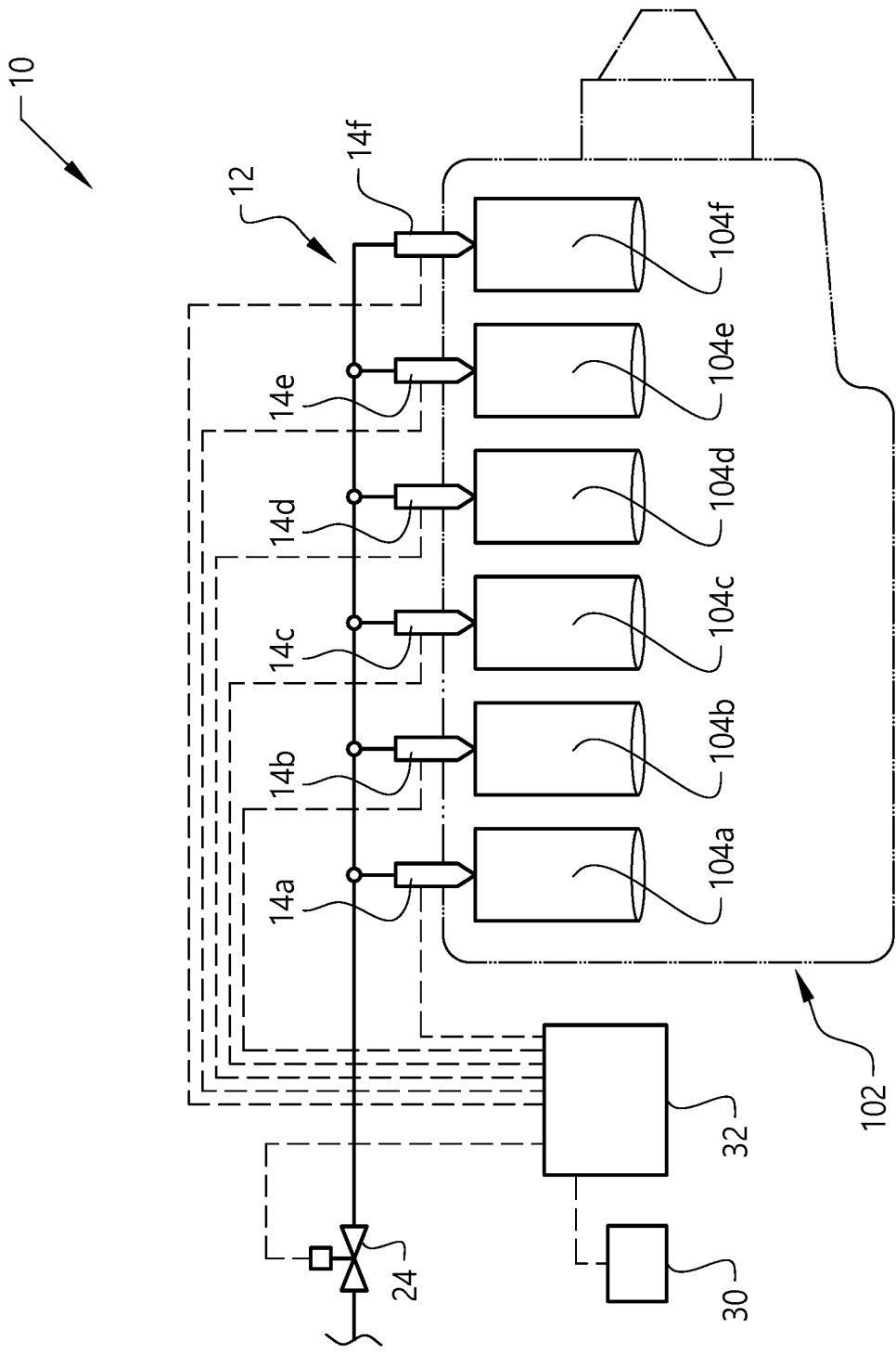
FIG. 7 a schematic view of a fuel system according to an embodiment of the invention.

FIG. 7 illustrates the fuel system 10 similar to that of FIG. 1, but without the tank 18, the pump 20, the evaporator 22, the release valve 26, and the other tank 28.

It is to be understood that the present invention is not limited to the embodiments described above and illustrated in the drawings; rather, the skilled person will recognize that many changes and modifications may be made within the scope of the appended claims.

For example, the inlet and release valves 24, 26 may be mechanically coupled and synchronized, wherein both may be closed at the same time by operating the valves 24, 26 in a deadband (offset). Furthermore, in case the vehicle 100 is a dual fuel vehicle, for example running on methane and diesel, the inlet valve 24 (for methane) may be reduced or closed by controlling the diesel pressure accordingly.

Furthermore, instead of the fuel system 10 having a common rail 12, each injector may have an accumulator in the form of a high pressure chamber, which injectors may be referred to as unit injectors.

The invention claimed is:

1. A method for controlling gaseous fuel pressure in an accumulator of a fuel system for a combustion engine of a vehicle with the steps of:
   determining a nominal amount of gaseous fuel to be introduced into the accumulator; the nominal amount depending on the torque demand,
introducing less gaseous fuel into the accumulator than the determined nominal amount as a response to decreasing fuel demand by reducing or closing an inlet valve, which inlet valve is adapted to regulate input of gaseous fuel to the accumulator;

while the inlet valve is reduced or closed, performing at least one injection of gaseous fuel coming from the accumulator into at least one combustion chamber of the combustion engine by at least one injector of the fuel system, which at least one injection contributes to combustion in the combustion engine, thereby reducing pressure in the accumulator, and mitigating any excessive torque caused by the reducing of pressure by braking the vehicle.

2. A method according to claim 1, wherein the at least one injection is performed without venting gaseous fuel from the accumulator to a tank of the fuel system.

3. A method according to claim 1, wherein the fuel system further comprises a release valve adapted to regulate venting of gaseous fuel from the accumulator to a tank of the fuel system, and wherein the at least one injection is performed while the release valve is closed.

4. A method according to claim 3, wherein the inlet valve and the release valve are individually and electrically operated.

5. A method according to claim 1, wherein the reducing of pressure is performed in response to a current accumulator pressure need.

6. A method according to claim 1, wherein the at least one injection has a near minimum duration.

7. A method according to claim 1, further comprising:
    predicting a future accumulator pressure need,
wherein the reducing of pressure is performed in advance in response to the predicted future accumulator pressure need.

8. A method according to claim 7, further comprising:
    mitigating the in advance reducing of pressure by prolonging the duration of the at least one injection.

9. A method according to claim 1, wherein the inlet valve is reduced or closed and the at least one injection is performed such that the inlet valve has a reduced gaseous fuel mass flow rate compared to the gaseous fuel mass flow rate of said at least one injection.

10. A method according to claim 1, wherein the accumulator is a common rail in fluid communication with the at least one injector.

11. A method according to claim 1, wherein the gaseous fuel is natural gas or biogas.

12. A fuel system for a combustion engine of a vehicle, wherein the fuel system comprises:
    an accumulator;
    an inlet valve adapted to regulate input of gaseous fuel to the accumulator;
at least one injector;
    means configured to determine a nominal amount of gaseous fuel to be introduced into the accumulator; the nominal amount depending on the torque demand, and
    a control unit configured to reduce or close the inlet valve so as to introduce, as a response to decreasing fuel demand, less gaseous fuel into the accumulator than the nominal amount determined by said means, and to trigger at least one injection of gaseous fuel coming from the accumulator into at least one combustion chamber of the combustion engine by the at least one injector, while the inlet valve is reduced or closed, which at least one injection contributes to combustion in the combustion engine, thereby reducing pressure in the accumulator, and configured to mitigate any excessive torque.

13. A computer program comprising program code means for performing the steps of claim 1 when said program is run on a computer.

14. A computer readable medium carrying a computer program comprising program code means for performing the steps of claim 1 when said program product is run on a computer.

15. A control unit for controlling gaseous fuel pressure in an accumulator of a fuel system for a combustion engine of a vehicle, the control unit being configured to perform or trigger the steps of the method according to claim 1.

16. A vehicle comprising a fuel system according to claim 12.

17. The fuel system of claim 12 wherein the control unit is further configured to mitigate any excessive torque caused by the reducing of pressure by braking the vehicle.

18. The fuel system of claim 12 wherein the control unit is further configured to mitigate any excessive torque caused by the reducing of pressure by recuperating the energy of the excessive torque in an electric machine and/or energy storage of the vehicle.

* * * * *